(No Model.)
O. TABER.
SADDLE TREE.
No. 480,220. Patented Aug. 2, 1892.
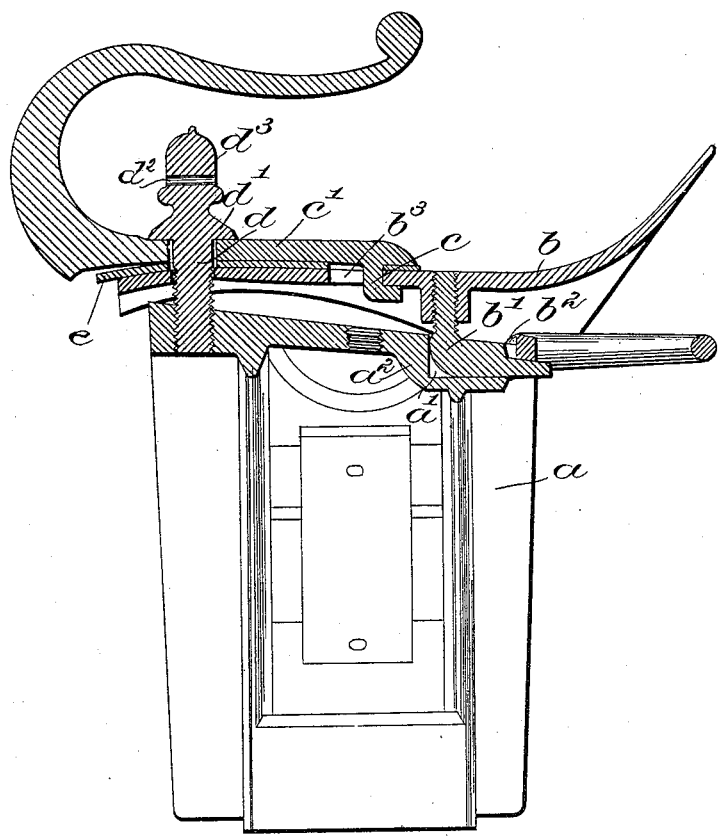
Witnesses.
Fred S. Greenleaf.
Fred L. Ashworth.
Inventor.
Orrin Taber.
by Crosby & Gregory
Attys.

UNITED STATES PATENT OFFICE.

ORRIN TABER, OF NASHUA, NEW HAMPSHIRE, ASSIGNOR TO THE NASHUA SADDLERY HARDWARE COMPANY, OF SAME PLACE.

SADDLE-TREE.

SPECIFICATION forming part of Letters Patent No. 480,220, dated August 2, 1892.

Application filed December 30, 1891. Serial No. 416,527. (No model.)

*To all whom it may concern:*

Be it known that I, ORRIN TABER, of Nashua, county of Hillsborough, State of New Hampshire, have invented an Improvement in Saddle-Trees, of which the following description, in connection with the accompanying drawing, is a specification, like letters on the drawing representing like parts.

This invention has for its object to improve the construction of saddle-trees,

In accordance with this invention the seat and tree are connected at one end by a hook and at the other end by a screw or equivalent device, and the checkrein hook and seat are connected at one end by a hook and at the other end by a screw or equivalent device, the same screw being preferably employed to connect the three parts.

The drawing shows in vertical section a saddle-tree embodying this invention.

The tree $a$, for the most part of usual construction, has formed in it a mortise $a'$, which has an opening at one side, as at the rear side, and in order that the mortise may be made of sufficient depth a boss $a^2$ is formed on the under side of the tree. The seat $b$ has screwed or otherwise connected to it at one end, as at the rear end, a hook $b'$, which is turned rearwardly, as shown, and is provided with a shoulder $b^2$. The hook is adapted to be placed in the mortise $a'$, with its end portion beyond the shoulder $b^2$ projected through the opening at the rear side thereof, so as to bear against or engage the under side of the tree, and thereby connect the seat and tree together. This mortise $a'$, with its rear opening, constitutes the hook-engaging part to receive the hook $b'$. The seat $b$ has a hole $b^3$ through it, which constitutes another hook-engaging part, it being adapted to receive a hook $c$, formed on the under side of the checkrein-hook $c'$, said hook $c$ projecting through the seat and bearing against or engaging the under side thereof, as shown.

A screw or equivalent device $d$ passes down through a hole in the checkrein-hook $c'$ and through a hole in the seat $b$ and into or through a screw-threaded hole in the tree $a$, said screw having a head or flange $d'$, and for the purpose of conveniently removing it the head is provided with a transverse hole or passage $d^2$ through it to receive the pin or other tool by which it may be turned.

As herein shown, a piece of leather $e$ is interposed between the checkrein-hook $c'$ and seat $b$, yet this material may be omitted or any other material substituted for it.

I prefer to secure the hooks to the removable parts and to provide the stationary parts with the hook-engaging portions, yet it is obvious that such arrangement may be reversed.

By connecting the seat and checkrein-hook to the tree in the manner herein shown it will be seen that they may be very quickly placed in position, rigidly secured, and at the same time very cheaply manufactured, and by means of the hooked connections the parts are prevented from wabbling.

I claim—

1. A saddle-tree having a mortise $a'$ with an opening at the rear thereof, combined with a seat having upon its under side an L-shaped hook to enter and rest in said mortise, the end of said hook projecting through the opening in said mortise to bear against and engage the under side of the adjacent part of the tree, and thereby connect it to the saddle at one point, substantially as described.

2. A saddle-tree having a mortise $a'$ with an opening at the rear thereof, combined with a seat having upon its under side a detachable L-shaped hook to rest in said mortise, the shank of said hook being screw-threaded to enter a socket in the seat, the end of the hook projecting through the opening in the mortise, bearing against and engaging with the under side of the adjacent portion of the tree, and thereby connecting it to the saddle at one point, substantially as described.

3. A saddle-tree having a hook-retaining opening, and a seat having upon its under side a hook to enter and engage with said opening, said seat having an opening therein, combined with a checkrein-hook having a hook upon its under side to engage with the opening in the seat and connect said checkrein-hook thereto at one point, substantially as described.

4. A saddle-tree and a seat connected therewith and a hook-retaining opening in said seat, combined with a checkrein-hook having at one end a retaining-hook to enter said opening and engage the seat, and a bolt extending through the other end of said checkrein-hook and the seat to connect them to the tree, substantially as described.

In testimony whereof I have signed my name to this specification in the presence of two subscribing witnesses.

ORRIN TABER.

Witnesses:
BERNICE J. NOYES,
EMMA J. BENNETT.